United States Patent
Bachar

(10) Patent No.: US 6,670,882 B1
(45) Date of Patent: *Dec. 30, 2003

(54) MULTI DROP STACK BUS DETECTOR METHOD AND APPARATUS

(75) Inventor: Yuval Bachar, Sunnyvale, CA (US)

(73) Assignee: Cisco Technology, Inc., San Jose, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/363,002

(22) Filed: Jul. 28, 1999

(51) Int. Cl.⁷ .......................... G05B 23/02; H04L 12/40
(52) U.S. Cl. ................. 340/3.5; 340/825.02; 370/438; 710/100
(58) Field of Search ................. 340/3.5, 51, 3.3, 340/3.6, 2.8, 2.6, 3.9, 505, 506, 517, 825.01, 825.02; 710/10, 9, 107, 104, 100, 115, 110, 111; 709/95, 208, 222, 238; 370/438, 451, 362, 403, 364

(56) References Cited

U.S. PATENT DOCUMENTS 5,495,240 A    2/1996   Heberie .............. 340/870.13
5,914,957 A  * 6/1999   Dean et al. ............ 370/438
5,946,321 A  * 8/1999   Dean .................... 370/451
6,163,823 A  * 12/2000  Henrikson ............. 710/100

* cited by examiner

Primary Examiner—Michael Horabik
Assistant Examiner—William Bangachon
(74) Attorney, Agent, or Firm—Campbell Stephenson Ascolese LLP

(57) ABSTRACT

A device and procedure for associating an identifier with each of a plurality of slave units in a master slave system is provided. In one aspect, a master outputs a signal on a multi-line bus with a single, preferably lowest-numbered, line pulled-up and the remaining lines pulled-down. A first slave in a daisy chain communication architecture, in response to the pull-up of the bus wire configures itself with the lowest-numbered slave number, preferably so as to respond to a lowest-numbered com line. The first slave unit then outputs, to the next slave unit, a signal on the multi-line bus with the next-higher numbered line pulled-up and all other lines pulled-down. In response, the second slave unit will configure itself with the second-lowest slave identifier number such as configuring itself to respond to the second-lowest com line, and so forth. The system can be implemented to eliminate the need for slave addressing and can be implemented with relatively few components in a low cost and non-complex fashion.

19 Claims, 3 Drawing Sheets

MULTI DROP STACK BUS DETECTOR METHOD AND APPARATUS

The present invention relates to assigning numbers or other indicators to each of a plurality of clustered components and in particular to assigning numbers or indicators to slave units in a multi-drop stack bus network or other communication system.

BACKGROUND INFORMATION

A number of computer network and similar systems include a plurality of clustered components such as clustered switches, hubs and the like. It is not uncommon for such clustered devices to be configured in a master/slave relationship such that at least one unit is designated as a master unit which performs control functions with respect to slave units, as will be understood by those of skill in the art. For example, a computer network may include a plurality of network switches, one of which is designated as a master switch with remaining unit designated as slave switches. One approach to providing a master/slave system is an addressing system in which each communication intended for a slave unit is accompanied by or associated with an address and wherein each slave unit will take (appropriate) action only with respect to those communications which are addressed to it. An addressing system has a relatively high overhead, both in terms of the bandwidth needed for the addressing operations or communications and in terms of the components and the complexity involved in providing an addressing system. Accordingly, it would be useful to provide a master-slave system which can be implemented without the need for addressing of slaves in the master/slave system.

In a number of configurations, it is desirable for each slave unit to be assigned a unique identifier such as a number. For convenience of description, identifiers can be designated as "0" "1" "2" . . . "N", although the manner in which the designators can be represented e.g. by binary numbers and the like, can vary widely as will be understood by those of skill in the art. Typically, at least each slave unit should have stored therein (or accessible thereto) its own number (or other designator) and preferably, the master unit should have stored therein (or accessible thereto) information related to the indicators for the various slave units e.g. so that the master unit can determine items such as how many slave units are currently connected, which slave units are coupled to, or will recognize, which ones of a plurality of communication (or other) lines, and the like. Accordingly, it would be useful to provide a method and apparatus for establishing numbers or other identifiers for a plurality of slave units in the master-slave system.

In some systems, identifiers were assigned to or associated with slave units by software systems. For example, a master unit can broadcast polling signals to slaves and perform, e.g., arbitration procedures to associate identifiers with particular slave units. Often, however, software procedures can occupy an undesirably large proportion of processor resources and, typically, will require renegotiation (or rearbitration) in response to changes in the configuration (such as removing a slave unit from system-operable status therein) and the like. Moreover, each such arbitration or negotiation process can be relatively time-consuming and may involve interruption of normal data communications in the system for a relatively long period of time. Accordingly, it would be useful to provide a system for associating numbers or other identifiers with slave units, which can be performed relatively rapidly, avoid at least some occurrences of negotiation or arbitration with the master unit and, which preferably can be performed at least partially without a software implementation, e.g. by hardwired logic or components or substantially by hardware. Preferably, a system for assigning identifiers to slave components is achieved in a manner which is relatively low cost to design, fabricate, install and/or maintain.

SUMMARY OF THE INVENTION

In one aspect, the master and the various slave devices are coupled, at least along a first communication link, in a daisy chain fashion i.e. such that each slave device receives communication from a preceding slave device (or, in the case of the first slave device in the daisy chain, from the master) and outputs data along the daisy chain to the next or subsequent slave device (except for the last slave device in the chain). Each slave device receives, on the incoming or input link, input information which can be used to establish or associate a number or other identifier with such slave device and outputs, along the output link to the next slave unit in the chain (if any) output information which differs from the received input information and which enables the next slave device in the chain to establish or associate its own identifier or number. In one embodiment, each link in the daisy chain is an N-wire bus where N is preferably greater than or equal to the number of slave units. The master outputs, e.g. a "high" value on a pre-determined line (or pattern) of the N-wire bus (e.g. providing a pull-up voltage on a wire of the N-wire bus). Those of skill in the art will understand how to pull-up and pull-down desired lines. Each slave determines, e.g., which wire of the N-wire bus is the lowest-numbered wire having a low signal or value (if any) and assigns itself a number corresponding to the number of such wire. The slave unit then outputs, to the next sequential slave unit, an output signal in which the wire which is numbered one more than its indicator number is pulled-up. Thus, the first slave unit, in this embodiment, will receive a high signal on the zero wire of the N-wire bus and will set itself equal to number 0. It will then output a high signal on wire number one (1) since one (1) is the next higher number after zero (0). The second slave unit will thus receive a signal which has a high value on the number one (1) wire of the N-wire bus and a low value on all other wires. It will thus, in response, set itself to have an indicator number of one (1) and will output, to the next sequential slave unit, a signal in which wire number two (2) of N-wire bus is pulled-up. In this manner, the system provides auto-detection of the data lines by the master, as well as by the slaves (i.e. without the need for manual setting of switches or other manipulation by a human operator).

In one embodiment, the N-wire bus is used exclusively for establishing or associating identifiers with each slave unit. In another embodiment, after the slave-units have been associated with identifiers, the N-wire bus can be used for other purposes such as control signal or data signal communications. It is possible to, in some embodiments, set, establish or associate numbers or other identifiers with slave units in response to a combination of levels on the various wires of the N-wire bus, e.g., such that high and low levels on various wires provide a binary indication which can be used to establish or associate an identifier, and/or otherwise using coding on the various wires in connection with establishing or associating an identifier with a slave unit.

Although it would be possible to use the associated identifiers as addresses in an addressing system, preferably, the present invention can be implemented without the need for addressing slave units. In one embodiment, a plurality of different communication lines are provided with each slave only "listening" to (or otherwise taking appropriate action with regard to) communications on a communication line associated with the slave identifier number.

In one embodiment, when a slave unit is removed from the daisy chain, becomes inoperable or otherwise is effectively no longer a part of the daisy chain, the data on the input line associated with that slave unit, in the daisy chain, is simply passed through to the output link for that slave unit, unchanged. The present invention can be implemented in a fashion such that, upon removal of a slave unit from the daisy chain, the system can continue operating substantially as before, i.e. without the need for renegotiating or rearbitrating (although renegotiating for associated identifiers can be performed in this situation, if desired). Similarly, in at least some embodiments of the present invention, if an additional slave unit is added to the daisy chain e.g. at the end of the chain, the new unit can establish or associate, e.g., the next sequential available number or identifier (e.g. using the process described above) without the need for renegotiating or otherwise interrupting other slave units. In this manner the system provides dynamic allocation of the data lines. Preferably, the assignment of identifiers in slave units can be performed using, substantially, all passive components e.g. without performing logical operations (other than possibly providing hard-wired logic gates). In some embodiments, it is preferred to provide a system for communicating information relating to the assignment of identifiers, from slave units to the master unit. For example, in some embodiments, it may be desirable for a slave unit to inform the master unit when the information being received in the incoming data link, has changed (possibly indicating removal or malfunction of the preceding slave unit). In some embodiments, it may desirable for the master unit to initiate a renegotiation of identifier associations in response to certain events, such as a slave unit detecting the removal of, or the re-connection of, a preceding slave unit (e.g. as indicated by a change or interruption in the incoming data signal).

In this fashion, switches or other system components can be added or removed from a master slave system while maintaining an operable system of slave numbers or other identifiers in a fashion which is relatively rapid and simple, preferably being based on hardware approaches, i.e. without the need for executing stored programs when associating identifiers with these slave units.

In one aspect, a device and procedure for associating an identifier with each of a plurality of slave units in a master slave system is provided. In one aspect, a master outputs a signal on a multi-line bus with a single, preferably lowest-numbered, line pulled-up and the remaining lines pulled-down. A first slave in a daisy chain communication architecture, in response to the pull-up of the bus wire configures itself with the lowest-numbered slave number, preferably so as to respond to a lowest-numbered com line. The first slave unit then outputs, to the next slave unit, a signal on the multi-line bus with the next-higher numbered line pulled-up and all other lines pulled-down. In response, the second slave unit will configure itself with the second-lowest slave identifier number such as configuring itself to respond to the second-lowest com line, and so forth. The system can be implemented to eliminate the need for slave addressing and can be implemented with relatively few components in a low cost and non-complex fashion.

DETAILED DESCRIPTION OF THE PREFERRED EMBODIMENT

Figure 1:
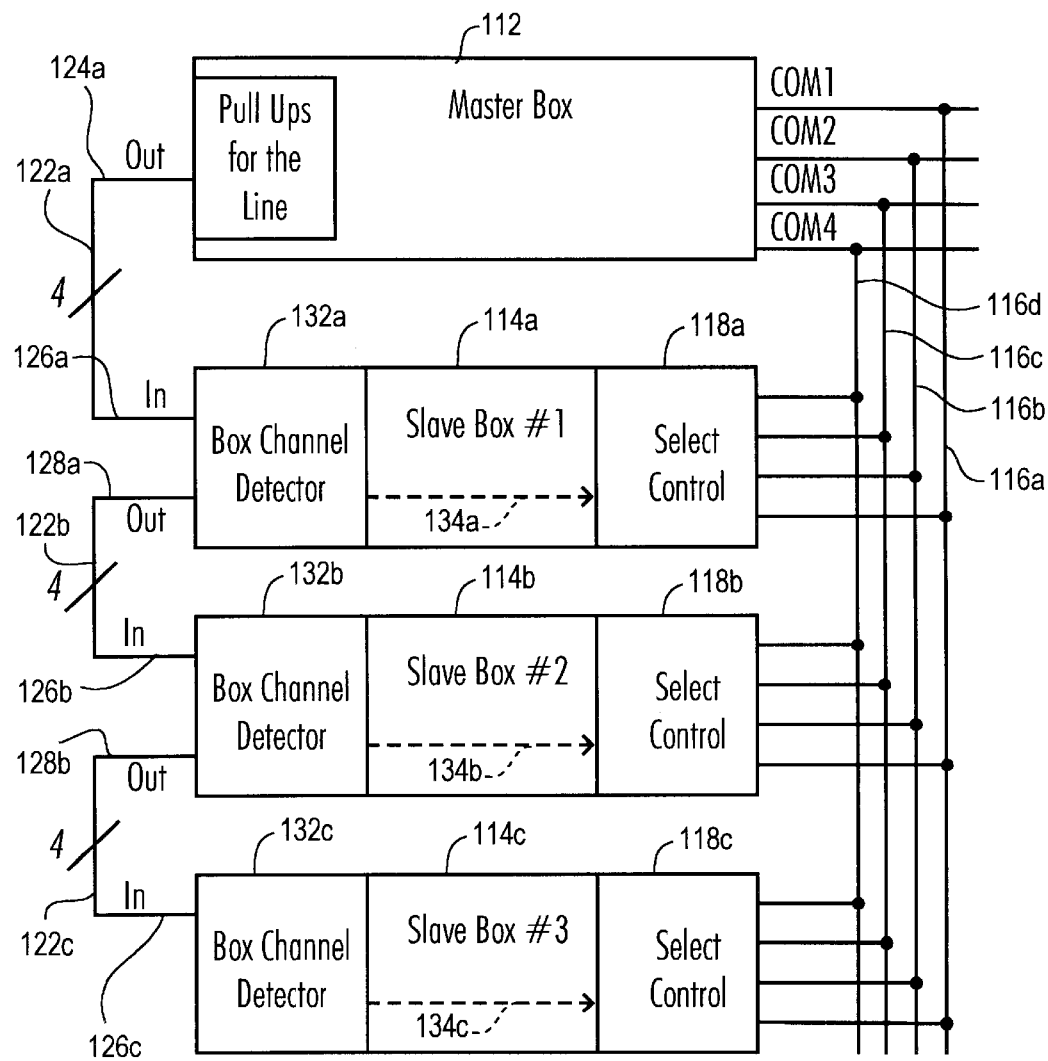
FIG. 1 is a block diagram of a master/slave system according to one embodiment of the present invention.

In the embodiment depicted in FIG. 1, a master unit, such as a first master switch unit 112, is coupled to three slave boxes (switches) 114a, b, c. In the depicted embodiment, four communications lines (com 1, com 2, com 3, com 4) 116a, b, c, d can be used for communicating data between the master switch 112 and the slave switches 114a, b, c. Although the configuration depicted in FIG. 1 shows four communication lines and three slave switches, the present invention can be used in connection with embodiments having more or fewer communication lines and more or fewer slave switches. In one embodiment, the master slave system is a multi-drop stack bus system, such as a management data clock/management data input-output (MDC/MDIO) system e.g. in accordance with IEEE 802.3u (incorporated herein by reference.)

Each slave switch 114a, b, c includes a select control component 118a, b, c for selecting one of the communication lines and, substantially provides the function of a four-to-one multiplexer. In one embodiment, the communication line 116a, b, c, d to which each respective slave switch 114a, b, c responds is related to an identifier, such as a identifier number, associated with each of the slave switches 114a, b, c. Using this system, it is possible to provide effective communication from the master 112 to a desired slave 114a, b, c without an addressing scheme. For example, if the system is configured such that the first slave 114a will respond to communications only on com line 1 116a, then the master 112 can send a particular communication to the first slave switch 114a by providing such communication on com line 1 116a and without necessarily associating the communication with an address.

In the depicted embodiment, the master switch 112 is coupled to the slave switches 114a, b, c in a daisy-chain fashion with a plurality of four-wire bus communication links 122a, b, c. In one embodiment, the wires of the bus are ordered in the sense that the wires represent increasingly larger values i.e. such that a high or active value on the lowest-numbered wire represents a least significant bit and a high or active value on the highest-numbered wire represents a most significant bit. The first link 122a receives output 124a from the master switch 112 and provides input 126a to the first slave switch 114a. The second link 122b receives output 128a from the first slave switch 114a and provides input 126b to the second switch 114b. The third link 122c receives output 128b from the second slave switch 114b and provides input 126c to the third slave switch 114c. Each slave switch 114a, b, c includes a channel detector 132a 132b 132c which responds to the received signals on 126a, b, c by both establishing or associating an identifier number with the slave switch 114a, b, c (and preferably using this number to control 134a, b, c the select control devices 118a, b, c) and also outputting signals 128a 128b onto the next link 122b 122c (if any). As described more fully below, each box channel detector 132a, b, c outputs a signal 128a 128b which is different from the received signal 126a 126b, e.g. differing in a fashion which will result in proper assignment of the identifier for the next, downstream switch, if any.

If desired, the present invention can be implemented in such a fashion that the daisy chain links 122a, b, c can be used for another purpose such as data communication, after the negotiation process associating identifiers with slave switches is completed. In embodiments in which the links 122a, b, c are used for another purpose, after the slave identifier numbers have been negotiated, the slaves will no longer continuously monitor the links for input changes during such other use of the links and thus it may not be possible to directly detect removal or malfunction of an upstream switch from the nature of the signals on the links 122a, b, c. In these configurations, if it is desired to respond to removal or malfunction of a slave switch, other devices or procedures for detecting such removal or malfunction will be needed, such as using the master 112 to periodically ascertain status of the slave switches 114 e.g. via a polling or a periodic interrupt system.

Figure 2:
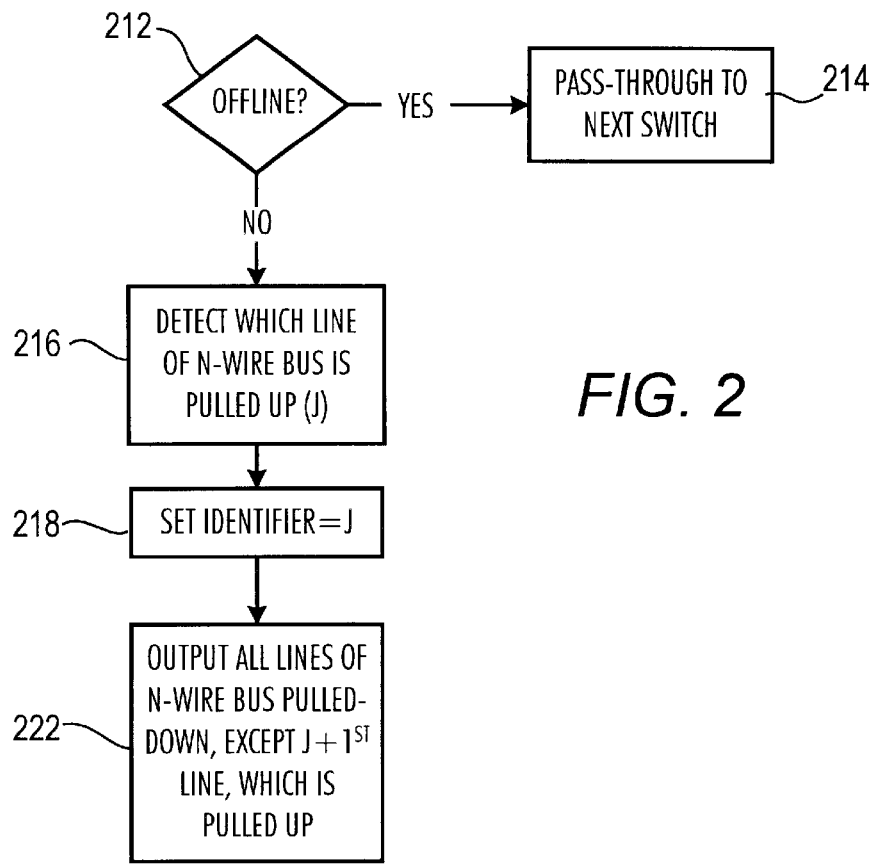
FIG. 2 is a flow diagram of a process for associating identifiers according to an embodiment of the present invention.
Figure 3:
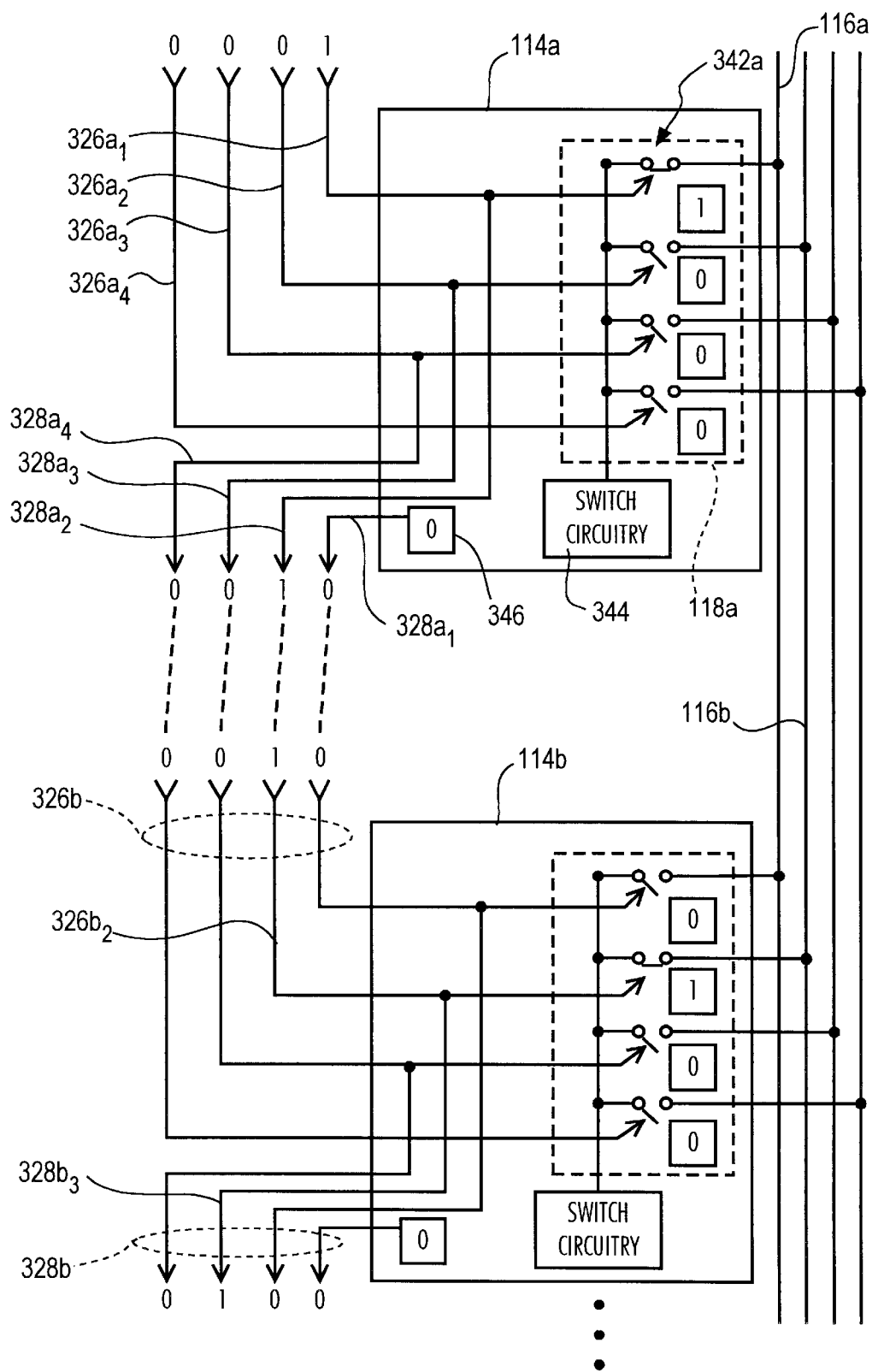
FIG. 3 is a schematic depiction of first and second slave switches according to an embodiment of the present invention.

As depicted in FIG. 2, preferably the channel detectors 132a, b, c are configured such that if the particular slave switch 114a, b, c is offline (powered down, inoperative or the like), e.g. not logically a part of the master/slave system at the present time, 212 then the received data 126a, b will simply be passed through onto the next link 128a, b without change 214. However, if the slave switch 114a, b, c is not offline, the bus channel detector 132a, b, c will detect which line of the four-wire bus 122a is-pulled-up (i.e. has a high or "one" value) 216. Preferably, the master switch 112 is configured so as to output 124a signals in which the predetermined one of the four wires of the four-wire output bus 122a is pulled-up (i.e. as a high or "one" value) with remaining wires being pulled-down (i.e. having a low or "zero" value). In one embodiment, the wire which is pulled-up by the master switch 112 is associated with the lowest-numbered wire of the four-wire bus. Accordingly, the channel detector 132a of the first slave box 114a will receive a high or "one" value on the lowest-numbered wire 326a, and a low or zero value on the remaining wires $326a_2$, $326a_3$, $326a_4$ (FIG. 3). In one embodiment, receiving a high value on the lowest-numbered wire results in associating the number "one" with the first slave switch 114a.

The number associated with a given switch can be used in a number of fashions. In the embodiment shown in FIG. 3, the number associated with the switch is used directly for controlling the multiplexer or select control 118a. In the depicted embodiment, a slave switch 114a which is associated with identifier one will receive communications on com line 1 116a. The embodiment of FIG. 3 depicts this control of select control 118a as closing a switch 332a under control of the first wire 326a (and such that the remaining switches of the sort control 118a are open). FIG. 3 depicts the mechanism using switches for the clarity of illustration, although, in practice, gates or other logic can be used for this purpose as will be understood by those of skill in the art after understanding the present disclosure.

Communications from the selected communication line 116a can then be provided to the switch circuitry 344. As depicted in FIG. 3, signals from the 3 least-significant lines of input $326a_1$ $326a_2$ $326a_3$ are provided to the three most significant lines of the output $328a_2$ $328a_3$ $328a_4$ and a hard-wired low or zero value 346 (e.g. as provided by a pull-down) is output on the least significant line $328a_1$ of the output. As seen in FIG. 3, when the signals input from the first switch 114a are provided as input 326b to the next switch 114b, since the second line $326b_2$ now has a high or "one" value, switch 114b will receive communication from the second com line 116b and the signal which is output 328b from the second switch 114b will have the third line $328b_3$ pulled-up with all remaining lines pulled-down.

According to the scheme depicted in FIG. 3, the identifier for each switch will be set equal to the number of the line on the input link which is pulled up (J) 218. The J+1 line (i.e. the line numbered one greater than the line which was pulled-up in the input), is pulled-up 222 and all other lines on the output link will be pulled-down.

Figure 4:
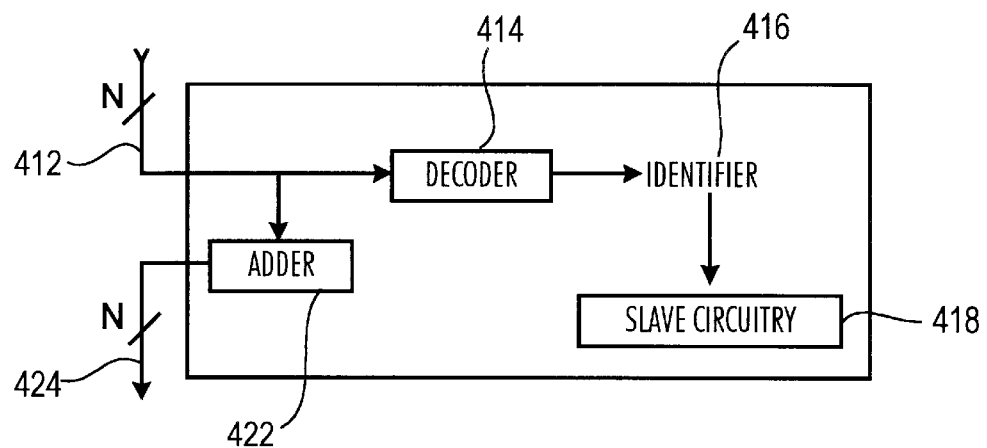
FIG. 4 is a block diagram of a slave switch according to an embodiment of the present invention.

In the embodiment as depicted in FIG. 3, each switch sets its identifier value based on the status of one of the N-wires of an N-wire bus. Accordingly, in the scheme of FIG. 3, the value of N (i.e. the number of wires in the N-wire bus) should be equal to or greater than the number of slave switches. It is also possible to use coding in connection with setting identifier numbers. For example, binary coding could be provided such that N bit values, carried on N-wires 412 are provided to a decoder 414 configured to output an identifier 416 for use by the slave circuitry 418. E.g., using normal binary coding, a two-wire bus could be used to provide identification for four slaves such that 00 represents number 1, 01 represents number 2, 10 represents number 3 and 11 represents number 4. In the embodiment depicted in FIG. 4, a binary adder or incrementer 422 would increment the received value 412 by one and output the result 424. It is also possible to provide multiple-bit data (for use in establishing or associating identifier numbers) in a serial fashion (e.g. over a single wire) such as by using a serial-in parallel-out register.

In one embodiment, slave switches 114 may provide identifier number or configuration information to the master switch 112. This may be unnecessary in some configurations. In the configuration of FIG. 3, for example, the relationship of switch number to com line number is an identity, in the sense that master 112 can operate on the basis that the first switch in the daisy chain is responding to the first com line, the second switch in the daisy chain is responding to the second com line and so forth. However, if desired, the system can be configured such that the slave switches can communicate, e.g. over the com lines, to the master 112 to report on their identifier numbers and com line connections, either in a response to a polling signal, from the master, or in an interrupt fashion.

In the embodiment of FIGS. 1 and 3, additional slave switches can be added, such as by adding to the end of the daisy chain of FIG. 1, without having to renegotiate all of the numbers or identifiers of the slave switches and substantially without having to interrupt communications on the remainder of the system. For example, in the configuration of FIGS. 1 and 3, the addition of a new slave switch at the end of the daisy chain will have no effect on the value of the signals on the already-existing links 122a, b, c and thus there is no need for changing or renegotiating the identifier numbers for these slave switches. The new switch added at the end of the daisy chain will receive the signal output from the channel detector 132c of the (formerly last) slave switch 114c and will thus properly, and automatically, establish its own identification number and com link configuration using the scheme described above.

In a situation in which a slave switch, such as switch 114b is turned off or malfunctions, preferably the channel detector 132b (or connectors thereto) will be configured such that the input signal 126b is merely passed through, without change, to the output line 128b. In this situation, it is possible for all remaining slave switches to continue functioning in the same manner as before, i.e. using the same identifier numbers and/or com link configurations as were used before turning-off the slave switch 114b. However, if desired, the system can also be configured to begin a renegotiation, following such a turning off of a slave switch. For example, in response to turning off slave box 114b, the signal 126c received in the slave switch 114c will undergo a change. In the embodiment of FIGS. 1 and 3, the channel detector 132c, prior to turning off slave switch 114b will receive "0100" but, after turning off slave switch 114b, will receive "0010". If desired, the system can be configured such that, in the response to such a change, slave switch 114c will send a message to the master switch 112 notifying it of the change and, in response, the master switch 112 can initiate a new negotiation of identifier numbers. Alternatively, the master 112 can be configured to never initiate a renegotiation in response to a turning off of a switch or can be configured to select whether to initiate a renegotiation, or not, depending on circumstances (e.g. initiating renegotiation only if network traffic is relatively light).

In certain situations, a slave switch may detect a transitory change in the data being received on the daisy chain link 122. Such a transitory change could result, e.g., from an upstream switch being turned off, and replaced by another switch, which is then turned on again. In one embodiment, in response to such a transitory change, identifier numbers for the entire daisy chain are renegotiated.

In light of the above description a number of advantages of the present invention can be seen. The present invention permits a master to control multiple slaves including through a common clock line (not shown) and multiple shared data lines. The present invention provides a simple and flexible way to implement a control path between a master and slaves in the stack, using any of a plurality of different protocols such as a serial bus protocol, including MDC/MDIO and others. The present invention can be used in a number of environments including multi-drop stack bus environments and, in general, substantially any multi-dropped multi-control line environment. The present invention provides a dynamic way to allocate data lines for a dynamic stack of switches, hubs and the like. The present invention requires a relatively small number of components and can be implemented at low cost. The present invention can be implemented so as to eliminate the need for addressing of slaves in a master/slave environment. The present invention can be provided in the context of a open daisy chain with multi-drop control lines in a stacked master/slave environment. According to the present invention the number of switches or other items is not predetermined and can be changed during normal operation. The present invention can preferably be implemented substantially without the use of active electronic components, i.e. using only passive components.

A number of variations of modifications of the invention can be used. It is possible to use some features of the invention without using others. For example, it is possible to use the invention for assigning identifiers to slave units without using the identifier for controlling the configuration of com lines. Although the present invention can be implemented so as to eliminate the need for addressing of slaves, it is possible to use some or all aspects of the present invention while also using slave-addressing. In the embodiment of FIG. 3 the association of an identifier number with a switch consists of the selection of which com line is recognized. Accordingly, association of an identifier number with a slave device does not require storage in memory, or otherwise, of a digital, binary or other representation of a number, either in the slave device or in the master device, although the storage in a register memory unit or other storage device can be performed if desired. Although the present invention has been described in the context of a computer network, some or all features of the present invention can be used in connection with other systems such as telephone or similar communications systems, cable or other video communication or distribution systems and the like. Although in the context of a computer network, embodiments of the invention have been described in connection with a master/slave cluster of switches, the present invention can also be used in connection with master/slave collections of other components such as hubs and the like. Although FIG. 3 depicts setting the output values by tapping selective lines from the input bus, other manners of providing output can be used such as by selectively activating pull-up or pull-down resistors or connections based on values on the input line and other schemes as will be clear to those of skill in the art after understanding the present invention. Although the embodiment depicted in FIG. 3 uses identifier numbers to directly control the select control 118a, b, c, it is possible to provide indirect control such as by using a decoder or other translator for converting an identifier number to a desired com line configuration.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g. for improving performance, achieving ease andor reducing cost of implementation. The present invention includes items which are novel, and terminology adapted from previous and/or analogous technologies, for convenience in describing novel items or processes, do not necessarily retain all aspects of conventional usage of such terminology.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. An apparatus for use in a network including a master unit and a plurality of slave units comprising:
   a plurality of communication links coupling said master unit and said plurality of slave units in a sequential daisy chain communication architecture, defining a last slave unit in said daisy chain;
   a channel detector, in each said slave unit, which receives an input identifier on a first of said communication links and, except for said last slave unit, outputs an output identifier to a slave unit, on a second link, wherein each said slave unit, in response to receipt of said input identifier is configured so as to be associated with an identifier number, different from an identifier number of at least one other slave unit, and outputs an output identifier which is different from said input identifier.

2. An apparatus, as claimed in claim 1, wherein:

each of said communication links comprises a multi-wire bus and wherein said input identifier comprises a pattern of binary data on said multi-wire bus.

3. An apparatus, as claimed in claim 2, wherein:

said pattern of data on each said link comprises a first value on one wire of said link and a second value on all wires other than said one wire of said link.

4. An apparatus, as claimed in claim 3, further comprising:

a plurality of communication lines coupled to each said slave unit, wherein, in response to receipt of said input identifier, said each said slave unit is configured to respond to at least one of said communication lines.

5. An apparatus, as claimed in claim 3, wherein:

each said communication link has said first value on a different wire of said multi-wire bus.

6. An apparatus, as claimed in claim 1, wherein:

said channel detectors of each of said slave units are substantially identical to one another.

7. An apparatus, as claimed in claim 1, wherein:

said master unit and said slave units are selected from the group consisting of network switches or network hubs.

8. A method for use in a network including a master unit and a plurality of slave units comprising:

coupling said master unit and said plurality of slave units in a sequential daisy chain communication architecture using a plurality of communication links defining a last slave unit in said daisy chain;

providing a channel detector in each said slave unit, receiving, in each said channel detector, an input identifier on one of said communication links;

outputting, from all slave units except for said last slave unit, to another slave unit, on another communication link, an output identifier which is different from said input identifier and configuring each said slave unit, in response to receipt of said input identifier, wherein each said slave unit is configured so as to be associated with an identifier number, different from an identifier number of at least one other slave unit.

9. A method, as claimed in claim 8, wherein:

each of said communication links comprises a multi-wire bus and further comprising providing said input identifier as a pattern of binary data on said multi-wire bus.

10. A method, as claimed in claim 9, wherein:

providing said pattern of said data comprises providing a first value on one wire of said link and a second value on all wires other than said one wire of said link.

11. A method, as claimed in claim 10, wherein:

each said communication link has said first value on a different wire of said multi-wire bus.

12. A method, as claimed in claim 8, further comprising:

configuring each said slave unit to respond to at least one of a plurality of communication lines coupled to said slave unit, in response to receipt of said input identifier.

13. An apparatus for use in a network including a master unit and a plurality of slave units comprising:

a plurality of Communication link means for coupling said master unit and said plurality of slave units in a sequential daisy chain communication architecture, defining a last slave unit in said daisy chain;

channel detector means, in each said slave unit, for receiving an input identifier on one of said communication links and outputting, except for said last slave unit, to another slave unit, on another communication link, an output identifier which is different from said input identifier in response to a receipt to said input identifier;

means for configuring each said slave unit so as to be associated with an identifier number, different from an identifier number of at least one other slave unit.

14. An apparatus, as claimed in claim 13, wherein:

each of said communication links comprises a multi-wire bus and further comprising means for providing said input identifier as a pattern of data on said multi-wire bus.

15. An apparatus, as claimed in claim 14, wherein:

said means for providing said input identifier as a pattern of data comprises means for providing a first value on one wire of said link and a second value on all wires other than said one wire of said link.

16. An apparatus, as claimed in claim 15, wherein:

each said communication link has said first value on a different wire of said multi-wire bus.

17. An apparatus, as claimed in claim 13, further comprising:

means for configuring each said slave unit to respond to at least one of a plurality of communication lines coupled to said slave unit, in response to receipt of said input identifier.

18. An apparatus, as claimed in claim 13, wherein:

said identifier number associated with each said slave unit is different from an identifier number associated with any other of said plurality of slave units.

19. An apparatus for use in a network including a master unit and a plurality of slave units comprising:

a plurality of communication links coupling said master unit and said plurality of slave units in a sequential daisy chain communication architecture defining a last slave unit in said daisy chain;

a channel detector in each said slave unit, which receives an input identifier on a first of said communication links and, except for said last slave unit, outputs an output identifier which is different from said input identifier to another of said plurality of slave units on a second of said communication links in response to receipt of said input identifier such that each of said plurality of slave units is configured so as to be associated with an identifier number which is different from an identifier number of at least one other slave unit.

* * * * *